US007299888B2

(12) United States Patent
Ohashi et al.

(10) Patent No.: US 7,299,888 B2
(45) Date of Patent: Nov. 27, 2007

(54) PUMP UNIT AND WORKING VEHICLE

(76) Inventors: Ryota Ohashi, c/o Kanzaki Kokyukoki Mfg. Co., Ltd., 18-1, Inadera 2-chome, Amagasaki-shi, Hyogo (JP); Hironori Sumomozawa, c/o Kanzaki Kokyukoki Mfg. Co., Ltd., 18-1, Inadera 2-chome, Amagasaki-shi, Hyogo (JP)

( * ) Notice: Subject to any disclaimer, the term of this patent is extended or adjusted under 35 U.S.C. 154(b) by 400 days.

(21) Appl. No.: 10/981,539

(22) Filed: Nov. 5, 2004

(65) Prior Publication Data
US 2005/0098363 A1 May 12, 2005

(30) Foreign Application Priority Data
Nov. 11, 2003 (JP) ............................. 2003-381523

(51) Int. Cl.
*B60K 25/08* (2006.01)
(52) U.S. Cl. ..................... 180/53.6; 180/307
(58) Field of Classification Search ............... 180/53.1, 180/53.4, 305, 306, 307, 308, 53.6
See application file for complete search history.

(56) References Cited
U.S. PATENT DOCUMENTS

| 4,395,865 | A | | 8/1983 | Davis, Jr. et al. | |
|---|---|---|---|---|---|
| 4,579,183 | A | * | 4/1986 | Irikura et al. ............... | 180/53.1 |
| 4,809,796 | A | * | 3/1989 | Yamaoka et al. .......... | 180/6.48 |
| 4,867,001 | A | * | 9/1989 | Sasaki et al. .................. | 74/424 |
| 5,046,994 | A | * | 9/1991 | Hasegawa et al. ............ | 475/83 |
| 5,809,756 | A | | 9/1998 | Scag et al. | |
| 6,457,546 | B1 | * | 10/2002 | Ishimaru et al. ............. | 180/305 |
| 6,571,894 | B2 | * | 6/2003 | Ishimaru et al. ........... | 180/53.4 |
| 6,601,474 | B2 | * | 8/2003 | Ishimaru et al. ....... | 74/665 GA |
| 2002/0003051 | A1 | * | 1/2002 | Ishii et al. .................. | 180/53.6 |
| 2002/0014358 | A1 | * | 2/2002 | Osuga et al. ............... | 180/53.6 |

FOREIGN PATENT DOCUMENTS
EP 1 350 421 A1 10/2003

* cited by examiner

Primary Examiner—Paul N. Dickson
Assistant Examiner—Tiffany L. Webb
(74) Attorney, Agent, or Firm—Sterne, Kessler, Goldstein & Fox P.L.L.C.

(57) ABSTRACT

First pump shaft having an input end is on a side opposite PTO shaft in the vehicle width direction with second pump shaft in between. First and second pump shafts are supported by a pair of bearing members respectively provided at second end wall and lid member so as to sandwich the corresponding gear, and center section. Housing has a seal case portion at a portion for supporting an end on a side closed to driving source of the PTO shaft, the seal case portion including a ring-shaped oil distributing chamber for supplying operation oil to a PTO clutch operating oil path formed in the PTO shaft so as to supply the operation fluid to the PTO clutch.

8 Claims, 13 Drawing Sheets (a)

(b)

PUMP UNIT AND WORKING VEHICLE

BACKGROUND OF THE INVENTION

1. Field of the Invention

The present invention relates to a pump unit used as a hydraulic source for a pair of hydraulic motor units allocated and arranged on both sides in a width direction of a vehicle so as to drive a pair of left and right driving axles, and to a working vehicle equipped with the pump unit.

2. Related Art

In a working vehicle, it is desirable to have a free space at a central portion in a width direction of the vehicle without enlarging the entire vehicle size. That is, by forming the free space at the central portion in the width direction of the vehicle, the free space can be used as an installation space for a mid-mount mower, used as a center discharger path and, further, used as an installation space for a mower lifting cylinder, thus enhancing the degree of freedom of design of the working vehicle.

For example, in U.S. Pat. Nos. 4,395,865 and 5,809,756 (hereinafter, referred to as cited references 1 and 2, respectively), there is proposed a working vehicle comprising a hydraulic pump unit operatively connected to a driving source, and a pair of hydraulic motor units allocated and arranged on both sides in a width direction of a vehicle so as to drive a pair of right and left driving axles, wherein the hydraulic pump unit and the pair of hydraulic motor units are fluidly connected to each other via a conduit.

The conventional working vehicle having the above configuration is effective in preventing a traveling-system transmission mechanism to be interposed between the pair of driving axles, but is ineffective with regard to the following points.

That is, in the working vehicle, a PTO-system transmission mechanism for transmitting power from the driving source to a working machine must be arranged in addition to the traveling-system transmission mechanism for transmitting power from the driving source to the pair of driving axles.

Therefore, according to the above working vehicle, not only the traveling-system transmission mechanism, but the PTO-system transmission mechanism must also be considered in order to secure a free space at the central portion in the width direction of the vehicle.

The conventional working vehicle prevents the traveling-system transmission mechanism from being positioned at the central portion in the width direction of the vehicle due to the above configuration, but the PTO-system transmission mechanism is not taken into consideration.

The present invention has been made in view of the above conventional art, and it is an object of the present invention to provide a pump unit applicable to a working vehicle equipped with a working machine. Herein, the pump unit forms a traveling-system transmission mechanism in cooperation with a pair of hydraulic motor units allocated and arranged on both sides in a width direction of a vehicle and, also, forms a PTO-system transmission mechanism for outputting rotational power toward the working machine. In addition, the pump unit can prevent both the traveling-system transmission mechanism and the PTO-system transmission mechanism from being positioned at a central portion in the width direction of the vehicle as much as possible.

It is another object of the present invention to provide a working vehicle capable of preventing both the traveling-system transmission mechanism and the PTO-system transmission mechanism from being positioned at the central portion in the width direction of the vehicle as much as possible.

SUMMARY OF THE INVENTION

According to one aspect of the present invention, there is provided a pump unit for transmitting mechanical power from a driving source through fluid power to first and second hydraulic motor units allocated and arranged on both sides in a width direction of a vehicle so as to be output to a pair of right and left driving wheels.

The pump unit includes an input shaft operatively connected to the driving source; first and second pump shafts operatively connected to the input shaft; first and second hydraulic pump bodies driven by the first and second pump shafts, respectively, and fluidly connected to the first and second hydraulic motor units, respectively; a housing for supporting the input shaft, the first pump shaft and the second pump shaft and, also, containing therein the first and second hydraulic pump bodies; and a PTO device contained in the housing.

The PTO device has a PTO shaft supported by the housing so as to be substantially parallel to the input shaft. The housing is configured to support the input shaft and the PTO shaft so that the input shaft is arranged at substantially a central portion in the width direction of the vehicle and the PTO shaft is displaced to and arranged on one side in the width direction of the vehicle with said input shaft as a reference, when the housing is mounted in the working vehicle.

With this configuration, the traveling-system transmission mechanism is formed in such a manner that the pump unit is fluidly connected to the first and second hydraulic motor units allocated and arranged on both sides in the width direction of the vehicle. It is accordingly possible to effectively prevent the traveling-system transmission mechanism from being positioned at the central portion of the body frame in the width direction of the vehicle.

In the present invention, further, the pump unit supports the input shaft operatively connected to the driving source and the PTO shaft for outputting power toward the working machine in a state where the input shaft and the PTO shaft are displaced each other in the width direction of the vehicle. Therefore, the pump unit is directly or indirectly arranged on the body frame in such a manner that the input shaft is positioned at substantially the central portion in the width direction of the body frame, so that the PTO shaft can be displaced to one side from substantially the central portion in the width direction of the body frame. With this configuration, it is possible to effectively prevent the PTO-system transmission mechanism from being positioned at the central portion in the width direction of the body frame.

As described above, according to the present invention, it is possible to effectively prevent both the traveling-system transmission mechanism and the PTO-system transmission mechanism from being positioned at the central portion in the width direction of the body frame. Accordingly, a free space can be secured at the central portion in the width direction of the body frame, thereby improving the degree of freedom in design of the vehicle.

For example, at least one of the input shaft, the first pump shaft and the second pump shaft may have an outward end extended outwardly from the housing. The outward end supports a member to be driven.

Alternatively, at least two of the input shaft, the first pump shaft and the second pump shaft may have outward ends extended outwardly from said housing. The outward ends support a cooling fan and a charge pump, respectively.

Preferably, the housing is configured so as to support the first and second pump shafts between the input shaft and the PTO shaft with respect to the width direction of the vehicle.

In the above various configurations, the input shaft and the first pump shaft may be arranged concentrically.

Preferably, the housing is configured so as to support the second pump shaft between the input shaft and the PTO shaft with respect to the width direction of the vehicle.

More preferably, the input shaft and the first pump shaft are integrally formed with a single member.

In the above various configurations, the input shaft, the first pump shaft, the second pump shaft and the PTO shaft may be arranged along the longitudinal direction of the vehicle.

In the above various configurations, for example, each of the first and second pump bodies has a cylinder block rotatably driven by the corresponding pump shaft, a piston provided in a slidable manner in an axial line direction of the pump and in a non-rotatable manner relative to the cylinder block about the axial line of the pump, and an output adjusting member for changing a sliding range in the axial line direction of the pump of the piston. The housing includes a housing body having a pump accommodating section which contains therein the first and second hydraulic pump bodies and communicates outwardly via a first opening into which the first and second hydraulic pump bodies can be inserted, and a center section formed with a part of a hydraulic circuit for fluidly connecting the first and second hydraulic pump bodies to the first and second hydraulic motor units, respectively. The first opening is liquid-tightly closed by the center section.

Preferably, the housing body may have a PTO accommodating section which contains therein the PTO device and communicates outwardly via a second opening into which the PTO device can be inserted. The second opening is positioned on the opposite side in the longitudinal direction of the vehicle to the first opening. The housing further has a lid member connected to the housing body so as to liquid-tightly close the second opening.

More preferably, the PTO device may include a hydraulic PTO clutch for selectively engaging/releasing the power transmission from the input shaft to the PTO shaft. The PTO clutch is configured so as to switch between the engaging state and the releasing state by supply/stop of a pressure oil to a clutch operating oil path perforated in the PTO shaft. The PTO shaft is supported by the housing body and the lid member. The support portion of the PTO shaft by the lid member is provided with a seal case part for introducing the pressure oil to the clutch operating oil path.

According to another aspect of the present invention, there is provided a working vehicle including a body frame; a driving source supported by the body frame; a pair of driving wheels supported by the body frame; a single pump unit operatively connected to the driving source and having a PTO device including a PTO shaft; a pair of hydraulic motor units fluidly connected to the pump unit, and allocated and arranged in a width direction of the vehicle so as to drive the pair of driving wheels; and a working machine operatively connected to the PTO device in the pump unit.

The pump unit further has an input shaft operatively connected to the driving source; first and second pump shafts operatively connected to the input shaft; first and second hydraulic pump bodies driven by the first and second pump shafts, respectively, and fluidly connected to the first and second hydraulic motor units, respectively; and a housing for supporting the input shaft, the first pump shaft, the second pump shaft and the PTO shaft and, also, containing therein the first hydraulic pump body, the second hydraulic pump body and the PTO device. The input shaft and the PTO shaft are allocated and supported at both sides in the width direction of the housing of the vehicle. The housing is directly or indirectly supported by the body frame so that the input shaft is positioned at substantially a central portion in the width direction of the body frame.

Preferably, the driving source is supported to the body frame so as to vibrate freely, and the housing is integrally connected to the driving source in a free state with respect to the body frame.

BRIEF DESCRIPTION OF THE DRAWINGS

The above, and other objects, features and advantages of the present invention will become apparent from the detailed description thereof in conjunction with the accompanying drawings wherein.

FIGS. 13(a) and 13(b) shows states where an accumulator is at an initial position and at a stroke end position, respectively.

DETAILED DESCRIPTION OF THE PREFERRED EMBODIMENTS

Hereinafter, description will be given of a pump unit according to a preferred embodiment of the present invention with reference to the accompanying drawings.

The pump unit according to the present invention configures a traveling-system transmission mechanism in cooperation with a hydraulic motor unit fluidly connected via a hydraulic circuit and driven by an action of a pressure oil in the hydraulic circuit and, also, configures a PTO-system transmission mechanism for outputting power to a working machine.

Figure 2:
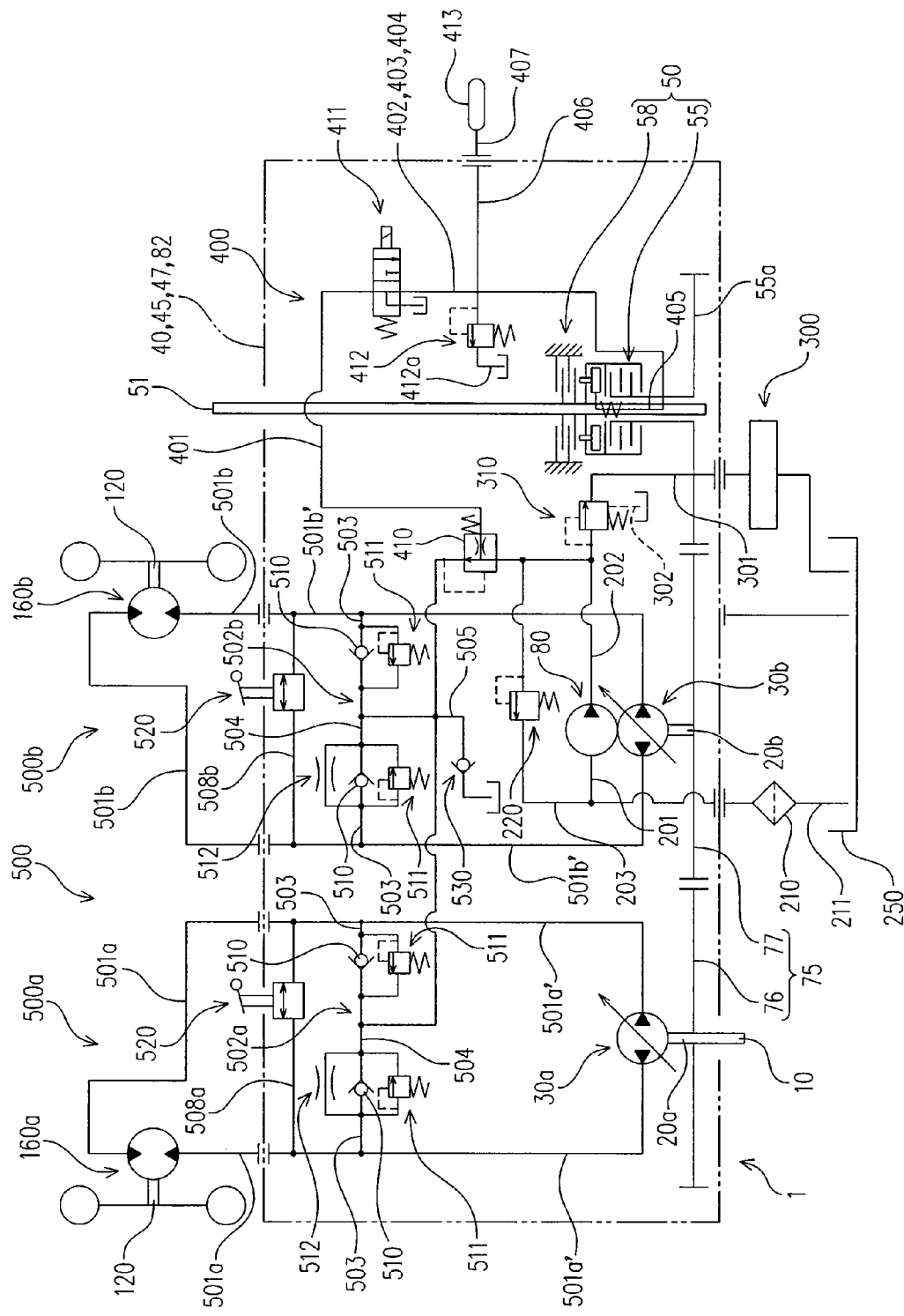
FIG. 2 is a hydraulic circuit diagram of the pump unit.
Figure 3:
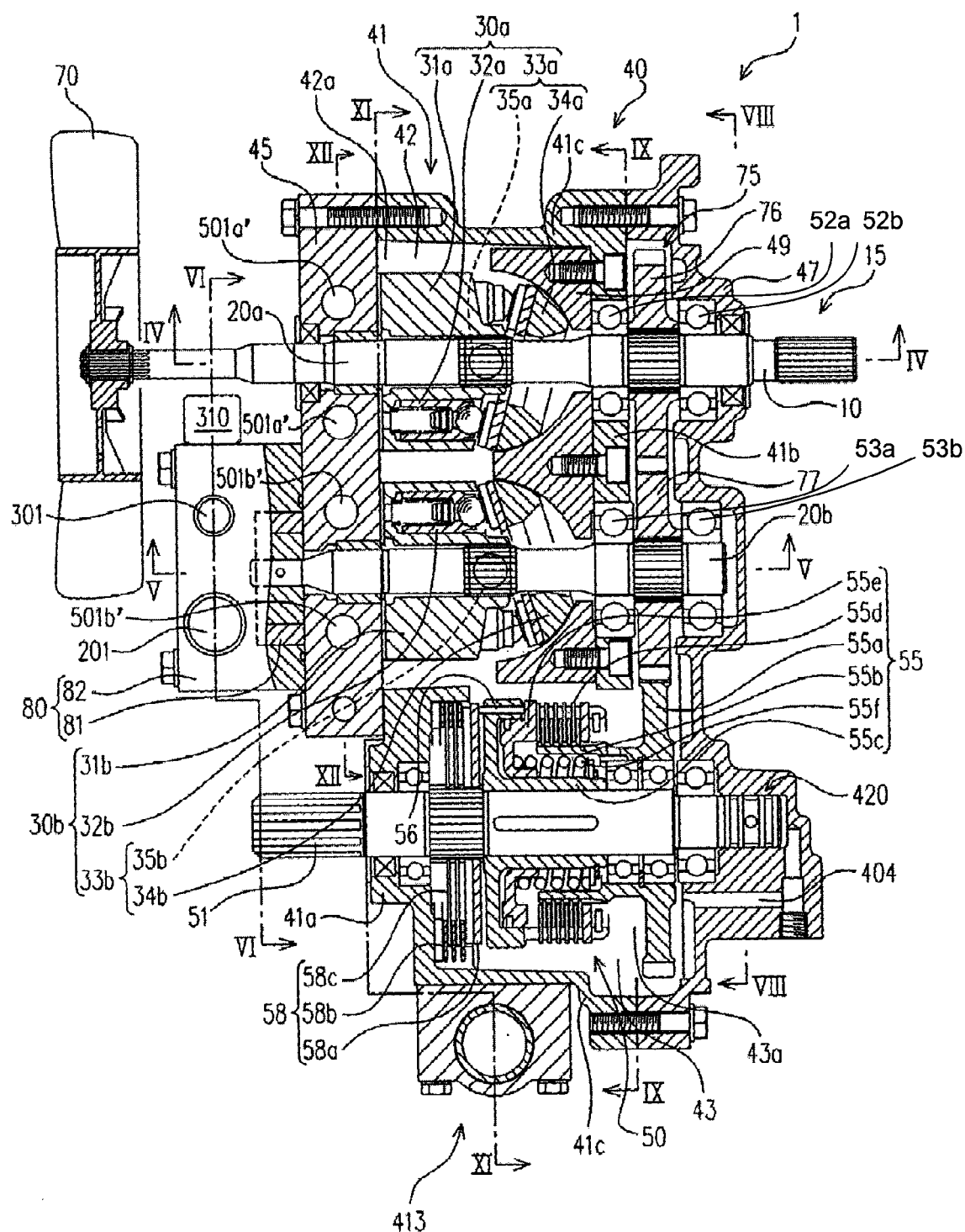
FIG. 3 is a transverse sectional plan view of the pump unit.

FIGS. 1(a) and 1(b) show a side view and a plan view of the working vehicle 100 to which the pump unit 1 according to this embodiment is applied. FIG. 2 shows a hydraulic circuit diagram of the pump unit 1. FIG. 3 shows a transverse sectional plan view of the pump unit 1 according to this embodiment.

First, description will be given of the working vehicle 100.

In this embodiment, the working vehicle 100 is of a mid-mount type in which a ground working machine 140 is arranged between a front wheel (caster 130 in this embodiment shown in the figure) and a rear wheel (driving wheel 120 in this embodiment shown in the figure) with respect to a longitudinal direction of the vehicle.

Figure 1:
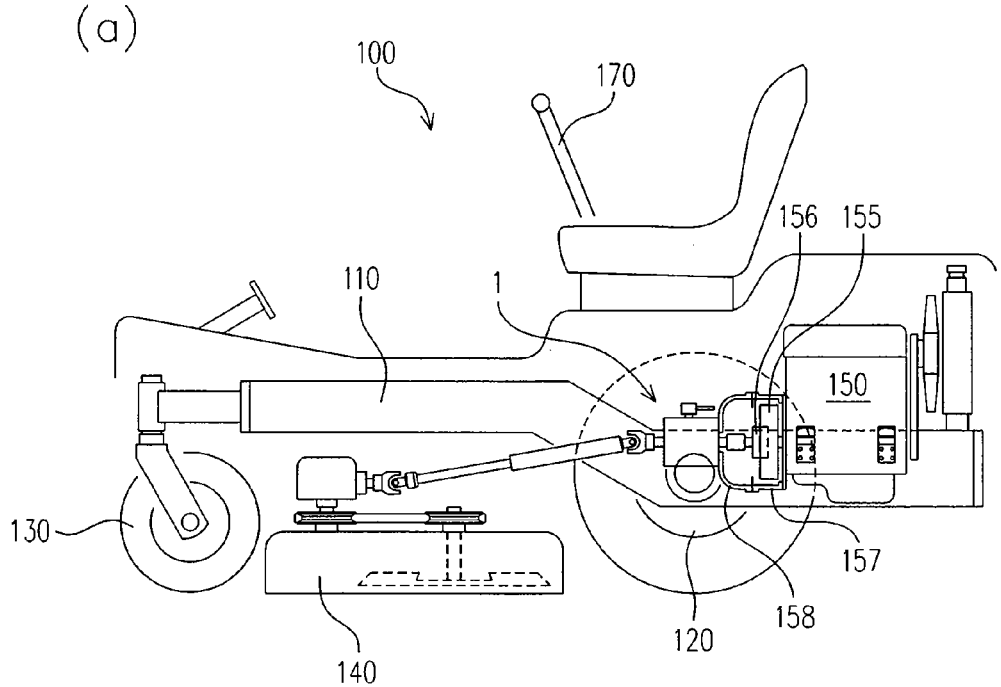
FIGS. 1(a) and 1(b) are a side view and a plan view of the working vehicle to which the pump unit according to this embodiment is applied, respectively.
Figure 1:
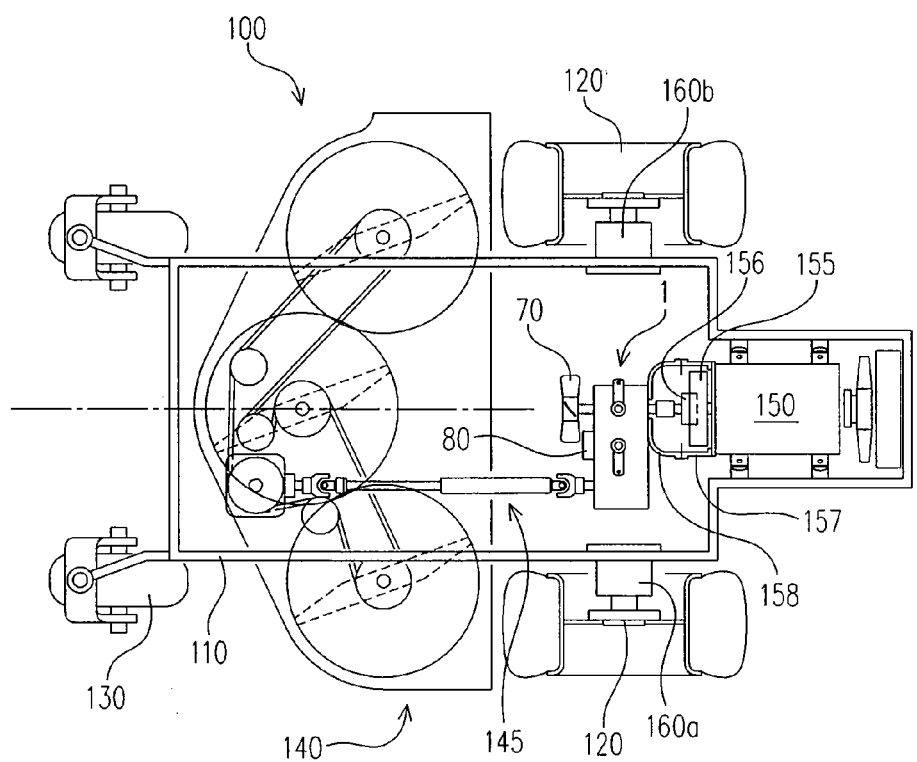

More specifically, the working vehicle 100, as shown in FIGS. 1(*a*) and 1(*b*), comprises a body frame 110, a pair of right and left driving wheels (rear wheels in this embodiment) 120 supported by the body frame 110, a pair of right and left casters 130 supported by the body frame 110 so as to be arranged on one side (forward side in this embodiment) in the longitudinal direction of the vehicle of the driving wheels 120, a ground working machine (mower in this embodiment) 140 supported by the body frame 110 so as to be positioned between the driving wheels 120 and the casters 130, a driving source 150 supported by the body frame 110 so as to be positioned on the opposite side (backward side in this embodiment) of the ground working machine 140 with the driving wheels 120 along the longitudinal direction of the vehicle, first and second hydraulic motor units 160*a*, 160*b* operatively connected at their motor shafts to the pair of right and left driving wheels 120, respectively, and the pump unit 1 according to this embodiment.

The first and second hydraulic motor units 160*a*, 160*b* are allocated and arranged on the left and right side along the width direction of the vehicle. Thus, the working vehicle 100 prevents the traveling-system transmission mechanism from being positioned at the central portion in the width direction of the vehicle, and secures a free space at the central portion in the width direction of the body frame 110.

Hereinafter, description will be given of the pump unit 1 according to this embodiment in detail.

Figure 4:
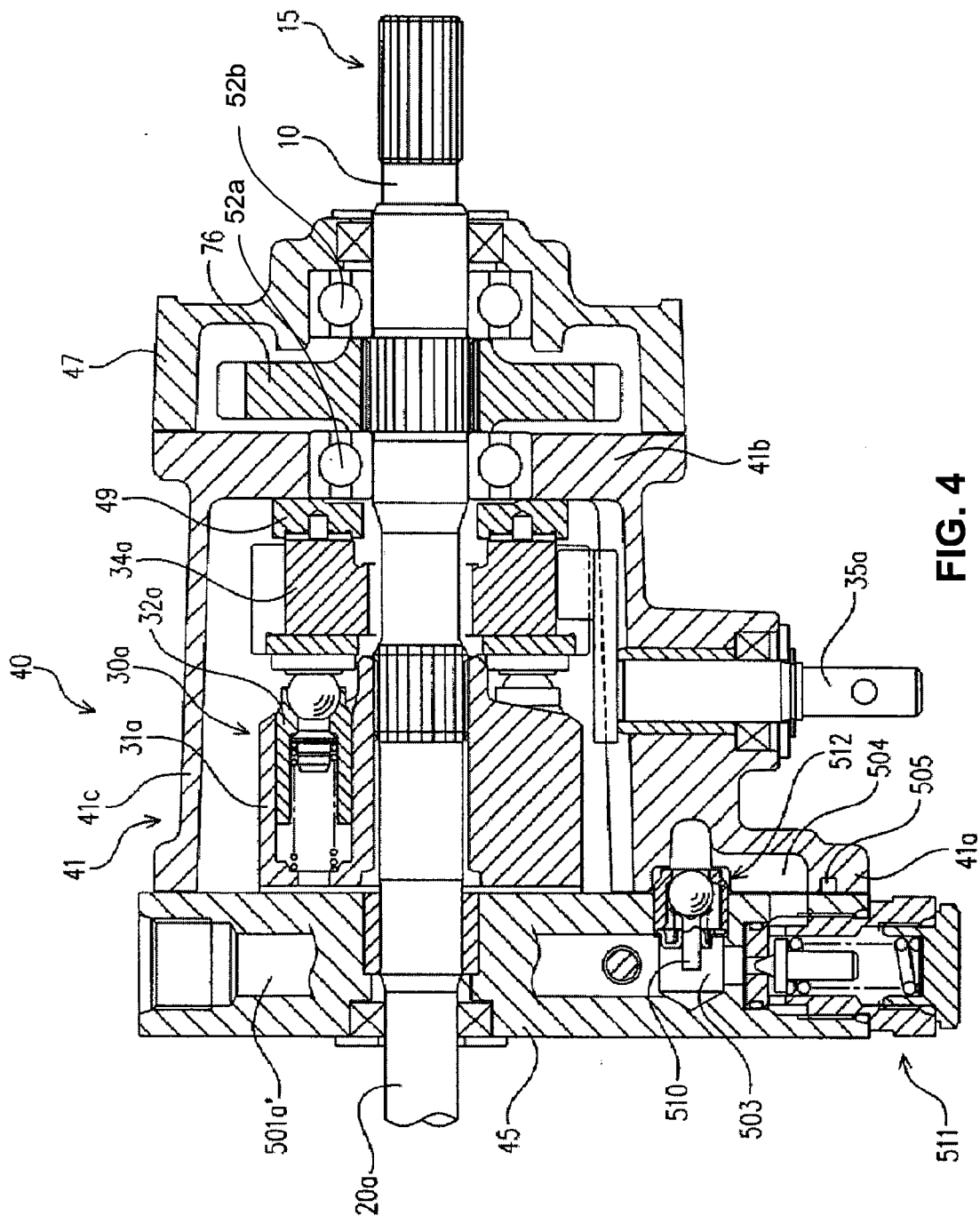
FIG. 4 is a cross sectional view taken along line IV-IV in FIG. 3.
Figure 5:
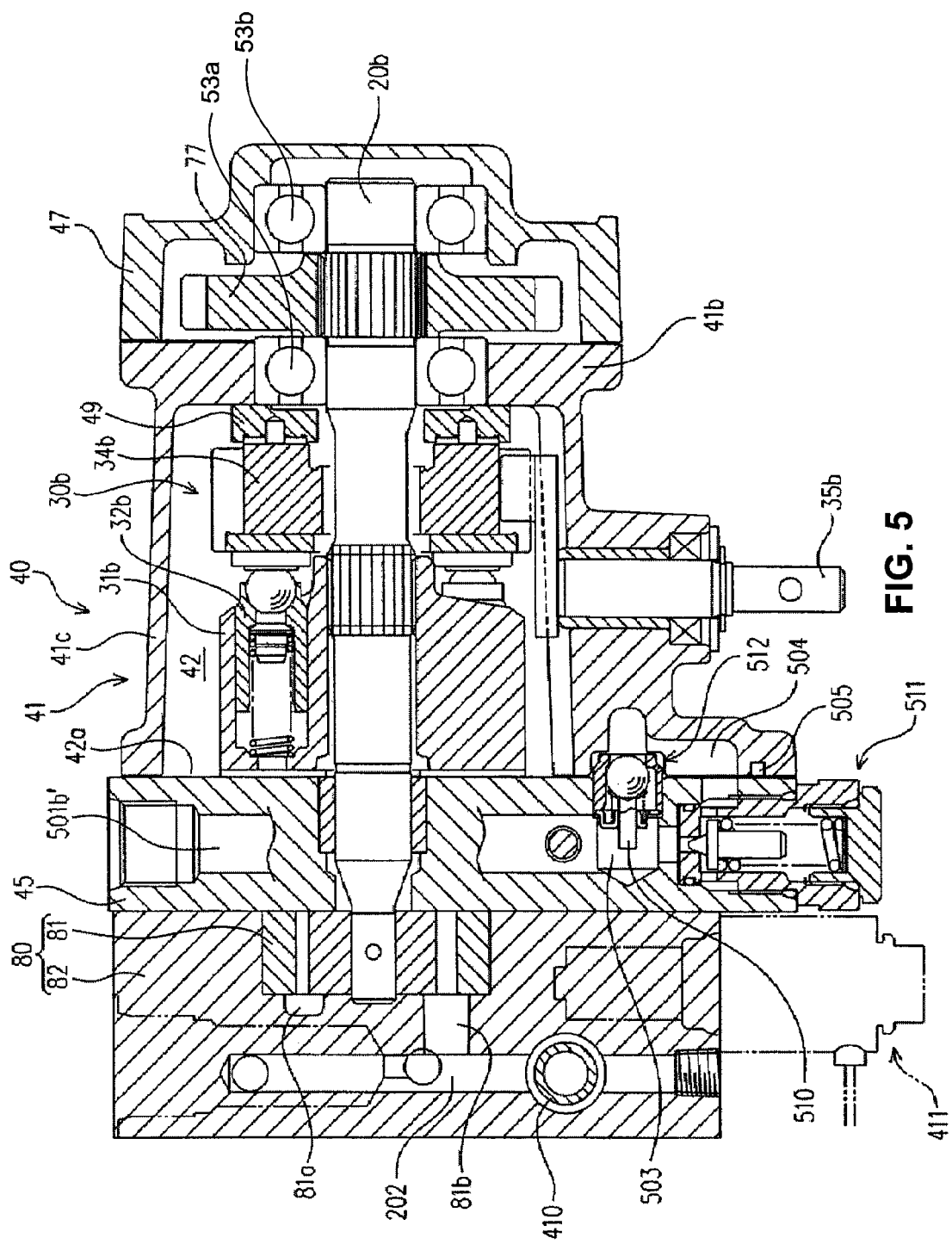
FIG. 5 is a cross sectional view taken along line V-V in FIG. 3.

FIGS. 4 and 5 show cross sectional views taken along lines IV-IV and line V-V in FIG. 3, respectively.

The pump unit 1, as described above, is configured so as to be fluidly connected to the hydraulic motors 160*a*, 160*b* arranged spaced apart from the pump unit 1 via the hydraulic circuit so that the hydraulic motors 160*a*, 160*b* output the power, which is input from the driving source 150 to the pump unit 1 and transmitted to the hydraulic motor units 160*a*, 160*b* via the action of the oil pressure, thereby driving the driving wheels 120. That is, the pump unit 1 forms the traveling-system transmission mechanism serving as a main transmission path together with the hydraulic motor units 160*a*, 160*b*.

The pump unit 1 is configured so as to branch the power from the driving source 150 and extract the driving power of the ground working machine 140. That is, the pump unit 1 also forms a part of the PTO-system transmission mechanism.

More specifically, as shown in FIGS. 3 to 5, the pump unit 1 comprises an input shaft 10 operatively connected to the driving source 150, first and second pump shafts 20*a*, 20*b* operatively connected to the input shaft 10, first and second hydraulic pump bodies 30*a*, 30*b* driven by the first and second pump shafts 20*a*, 20*b*, respectively, a housing 40 for supporting the input shaft 10, the first pump shaft 20*a* and the second pump shaft 20*b* and, also, containing therein the first and second hydraulic pump bodies 30*a*, 30*b*, a PTO device 50 contained in the housing 40, and bearing members 52*a*, 52*b* and 53*a*, 53*b* contained within housing 40 to respectively support first and second pump shafts 20*a*, 20*b*.

As shown in FIG. 2, the first hydraulic pump body 30*a* and the second hydraulic pump body 30*b* are fluidly connected to the first hydraulic motor unit 160*a* and the second hydraulic motor unit 160*b*, respectively, via a hydraulic circuit (a pair of first hydraulic lines 501*a* and a pair of second hydraulic lines 501*b* in this embodiment).

At least one of the first hydraulic pump body 30*a* and the first hydraulic motor unit 160*a* fluidly connected to each other is of a variable displacement type in which suction/discharge rates change by the operation of an output adjusting member, and a non-stepwise speed change output is obtained from the motor shaft of the first hydraulic motor unit 160*a* by controlling a slanting position of the output adjusting member.

Similarly, at least one of the second hydraulic pump body 30*b* and the second hydraulic motor unit 160*b* is of a variable displacement type in which suction/discharge rates changes by the operation of the output adjusting member, and a non-stepwise speed change output is obtained from the motor shaft of the second hydraulic motor unit 160*b* by controlling the slanting position of the output adjusting member.

In this embodiment, each of the hydraulic pump bodies 30*a*, 30*b* is of a variable displacement type and each of the hydraulic motor units 160*a*, 160*b* is of a fixed displacement type.

As clearly shown in FIGS. 3 and 4, the input shaft 10 is supported by the housing 40 so that an upstream end in the transmitting direction (rear end in this embodiment) extends outwardly (backward in this embodiment) from the housing 40 along the longitudinal direction of the vehicle, and is operatively connected to the driving source 150 via a flywheel 155.

Preferably, the flywheel 155 may be provided with a damper 156 (see FIG. 1). With this configuration, power transmission can be performed from the driving source 150 to the input shaft 10 while suppressing the angular speed variation of the output shaft of the driving source 150. It is therefore possible to improve the durability of the hydraulic pump bodies 30*a*, 30*b*. Further, since the pulsation of the oil ejected from the hydraulic pump bodies 30*a*, 30*b* is suppressed, the durability of the hydraulic motor units 160*a*, 160*b* subjected to the oil pressure is also improved and the noise/vibration can be reduced.

In this embodiment, the input shaft 10 is integrally formed with the first pump shaft 20*a* by a single member.

That is, the input shaft 10 and the first pump shaft 20*a* are defined as a single shaft 15.

The first pump shaft 20*a* is supported by the housing 40 along the longitudinal direction of the vehicle.

Preferably, the first pump shaft 20*a* may be configured to have a first end which extends outwardly (forward in this embodiment) from the housing 40 to drive a member to be driven by the first end.

In this embodiment, a cooling fan 70 serving as the member to be driven is provided.

In this embodiment, as described above, the first pump shaft 20*a* is integrally formed with the input shaft 10 and is defined as the single shaft 15.

According to the embodiment, the upstream side in the transmitting direction of the single shaft 15 configures the input shaft 10, and the downstream side of the transmitting direction configures the first pump shaft 20*a*.

In this embodiment, the single shaft 15 is extended outwardly from the housing 40 so that its rear end and the front end form a connection portion to the driving source 150 and a support portion of the cooling fan 70, respectively.

The second pump shaft 20b is also supported by the housing 40 along the longitudinal direction of the vehicle.

Preferably, the second pump shaft 20b may be configured to have a first end which extends outwardly from the housing 40 to drive a member to be driven by the first end.

In this embodiment, a charge pump 80 serving as the member to be driven is provided.

The charge pump 80 includes a charge pump body 81 driven by the outwardly extended end of the second pump shaft 20b, and a charge pump case 82 for surrounding the charge pump body 81.

The first and second pump shafts 20a, 20b are operatively connected to the input shaft 10, as described above.

More specifically, the pump unit 1 according to this embodiment includes a power transmission mechanism 75 for transmitting the rotational power of the input shaft 10 to the first and second pump shafts 20a, 20b.

In this embodiment, the first pump shaft 20a is integrally formed with the input shaft 10 by the single shaft 15, as described above.

Therefore, the pump unit 1 according to this embodiment comprises, as the power transmission mechanism 75, a driving gear 76 supported in a non-rotatable manner relative to the single shaft 15, and a driven gear 77 supported in a non-rotatable manner relative to the second pump shaft 20b so as to mesh with the driving gear 76.

The driving gear 76 and the driven gear 77 have a same pitch diameter; thus, the first pump shaft 20a (single shaft 15) and the second pump shaft 20b rotate in synchronization.

In this embodiment, the input shaft 10 is integrally formed with the first pump shaft 20a; however, the input shaft 10 and the first pump shaft 20a may of course be separately provided.

The first hydraulic pump body 30a includes a cylinder block 31a which rotates about an axis line of the first pump shaft 20a along with the rotation of the first pump shaft 20a, a piston unit 32a which rotates about the axis line of the first pump shaft 20a along with the rotation of the cylinder block 31a and, also, is slidable in the axis line direction of the first pump shaft 20a with respect to the cylinder block 31a, and an output adjusting member 33a (combination of movable swash plate 34a and an operating shaft 35a) which regulates the stroke length of the piston unit depending on the slanting position and changes oil suction/discharge rates by the cylinder block 31a.

The second hydraulic pump body 30b has substantially the same configuration as the first hydraulic pump body 30a except that the second hydraulic pump body 30b is driven by the second pump shaft 20b. Therefore, in the figure, similar reference characters with a different subscript are denoted for the members same as or corresponding to those of the first hydraulic pump body 30a, and the description of the second hydraulic pump body 30b will not be given herein.

In this embodiment, each of the hydraulic pump bodies 30a, 30b is of an axial piston type, but may also be of a radial piston type.

As clearly shown in FIG. 3, the PTO device 50 has a PTO shaft 51 for outputting the power toward the ground working machine 140.

The PTO shaft 51 is supported by the housing 40 along the longitudinal direction of the vehicle while being operatively connected to the input shaft 10.

The PTO shaft 51 is supported by the housing 40 so that a first end thereof extends outwardly. In this embodiment, the PTO shaft 51 has the front end thereof extending forward in the longitudinal direction of the vehicle.

The outwardly extended end of the PTO shaft 51 is operatively connected to an input part of the ground working machine via a vibration absorbing-type transmission means 145. In this embodiment, as shown in FIG. 1, a transmission shaft having universal joints on both ends serves as the vibration absorbing-type transmission means 145.

Preferably, the PTO device 50 may include a hydraulic clutch 55 for selectively engaging/releasing the power transmission from the input shaft 10 to the PTO shaft 51.

In this embodiment, as clearly shown in FIG. 3, the hydraulic clutch 55 includes a driving-side member 55a supported in a rotatable manner relative to the PTO shaft 51 and in a non-slidable manner in the axial direction, the driving-side member 55a being operatively connected to the input shaft 10, a driving-side friction plate 55b supported in a non-rotatable manner relative to the driving-side member 55a and in a slidable manner in the axial direction, a driven-side member 55c supported in a non-rotatable manner relative to the PTO shaft 51, a driven-side friction plate 55d supported in a non-rotatable manner relative to the driven-side member 55c and in a slidable manner within a certain range in the axial direction, a clutch pushing member 55e for friction-engaging the driven-side friction plate 55d with the driving-side friction plate 55b by the action of the oil pressure, and a clutch biasing member 55f for separating the clutch pushing member 55e from the driving-side friction plate 55b and the driven-side friction plate 55d.

The hydraulic clutch 55 of the above configuration transmits power from the input shaft 10 to the PTO shaft 51 via the driving-side member 55a and the driven-side member 55c when the clutch pushing member 55e friction-engages both friction plates 55b, 55d with each other by the action of the oil pressure, and blocks the power transmission from the input shaft 10 to the PTO shaft 51 when not subjected to the action of the oil pressure.

In this embodiment, the driving-side member 55a is operatively connected to the input shaft 10 via the power transmission mechanism 75.

More specifically, the driving-side member 55a is configured so as to mesh with the driven gear 77.

More preferably, the PTO device 50 may include a hydraulic brake 58 cooperatively operating with the clutch operation of the hydraulic clutch 55, and thus effectively prevents the PTO shaft 51 from continuously rotating by the inertia force of the connected ground working machine 140 when the hydraulic clutch 55 blocks the power.

In this embodiment, the hydraulic brake 58 includes a brake pushing member 58a connected to the clutch pushing member 55e via a connecting rod 56 so as to cooperatively operate with the clutch pushing member 55e, a fixed disk 58b supported in a non-rotatable manner relative to the housing 40, and a brake disk 58c supported in a non-rotatable manner relative to the PTO shaft 51 while facing the fixed disk 58c.

The brake pushing member 58a pushes the brake disk 58c toward the fixed disk 58b when the clutch pushing member 55e is separated from the driving-side friction plate 55b and the driven-side friction plate 55d.

The housing 40 is configured so as to contain the first and second hydraulic pump bodies 30a, 30b and the PTO device 50.

More specifically, the housing 40 includes a housing body 41 having a pump accommodating section 42 capable of containing therein the first and second hydraulic pump bodies 30a, 30b.

The pump accommodating section 42 is arranged on one side in the width direction of the housing body 41 of the vehicle, and is communicated outwardly via a first opening 42a into which the first and second hydraulic pump bodies 30a, 30b can be inserted.

The housing body 41 has, in addition to the pump accommodating section 42, a PTO accommodating section 43 capable of containing therein the PTO device 50.

The PTO accommodating section 43 is arranged on the other side in the width direction of the housing body 41 of the vehicle, and is communicated outwardly via a second opening 43a into which the PTO device 50 can be inserted.

More specifically, the housing body 41 has first and second end walls 41a, 41b positioned on both sides (forward and backward in this embodiment) in the longitudinal direction of the vehicle, and a peripheral wall 41c extending between the peripheral edges of the first and second end walls 41a, 41b.

That is, the housing body 41 is configured so that, of the inner space defined by the first end wall 41a, the second end wall 41b and the peripheral wall 41c, one side in the width direction of the vehicle forms the pump accommodating section 42 and the other side in the width direction of the vehicle forms the PTO accommodating section 43.

In the above configuration, the first opening 42a is formed in the first end wall 41a so as to correspond to the pump accommodating section 42, and the second opening 43a is formed in the second end wall 41b so as to correspond to the PTO accommodating section 43.

The housing 40 has, in addition to the housing body 41, a center section 45 connected to the first end wall 41a of the housing body 41 so as to liquid-tightly close the first opening 42a, and a lid member 47 connected to the second end wall 41b of the housing body 41 so as to liquid-tightly close the second opening 43a.

The center section 45 is connected to the housing body 41 so as to block the first opening 42a with the first and second hydraulic pump bodies 30a, 30b sandwiched with the second end wall 41b of the housing body 41.

The housing 40 also has a concave arc-shaped swash plate holder 49 on the side facing against the inner surface of the center section 45 in the second end wall 41b of the housing body 41.

That is, the center section 45 is configured so as to sandwich the first and second hydraulic pump bodies 30a, 30b with the swash plate holder 49.

The swash plate holder 49 may be integrally formed with the second end wall 41b, but in this embodiment, is removably connected to the housing body 41 so as to be positioned within the pump accommodating section 42.

In this embodiment, the swash plate holder 49 is provided separately from the housing body 41; thus, allowing the swash guide surface required for machining accuracy to be easily formed.

The center section 45 further has a part of an oil path for fluidly connecting the first and second hydraulic pump bodies 30a, 30b to the first and second hydraulic motor units 160a, 160b.

The oil path of the center section will be described later.

The lid member 47 is configured so as to block the second opening 43a while forming an accommodating space between the lid member 47 and the second end wall 41b of the case body 41.

The power transmission mechanism 75 is contained in the accommodating space defined between the lid member 47 and the second end wall 41b.

In the working vehicle 100, the housing 40 is integrally connected to the driving source 150 in a free state with respect to the body frame 110, as shown in FIG. 1.

More specifically, the housing 40 is connected to the driving source 150 via a flywheel cover and a mount member 158 integrally connected to the driving source 150.

When the housing 40 is integrally connected to the driving source 150 in a free state with respect to the body frame 110, the relative vibration of the housing 40 with respect to the driving source 150 can be prevented.

Therefore, the power transmission from the driving source 150 to the input shaft 10 can be reliably carried out.

Preferably, in the working vehicle 100, the output adjusting member 33a and the operating means 170 (see FIG. 1) arranged in the vicinity of the driver's seat can be connected by a vibration absorbing-type mechanical link mechanism or an electrical controlling means through an electrical signal, thereby effectively preventing the vibration propagation to the operating means.

Herein, description will be given of the hydraulic circuit in the pump unit 1.

Figure 6:
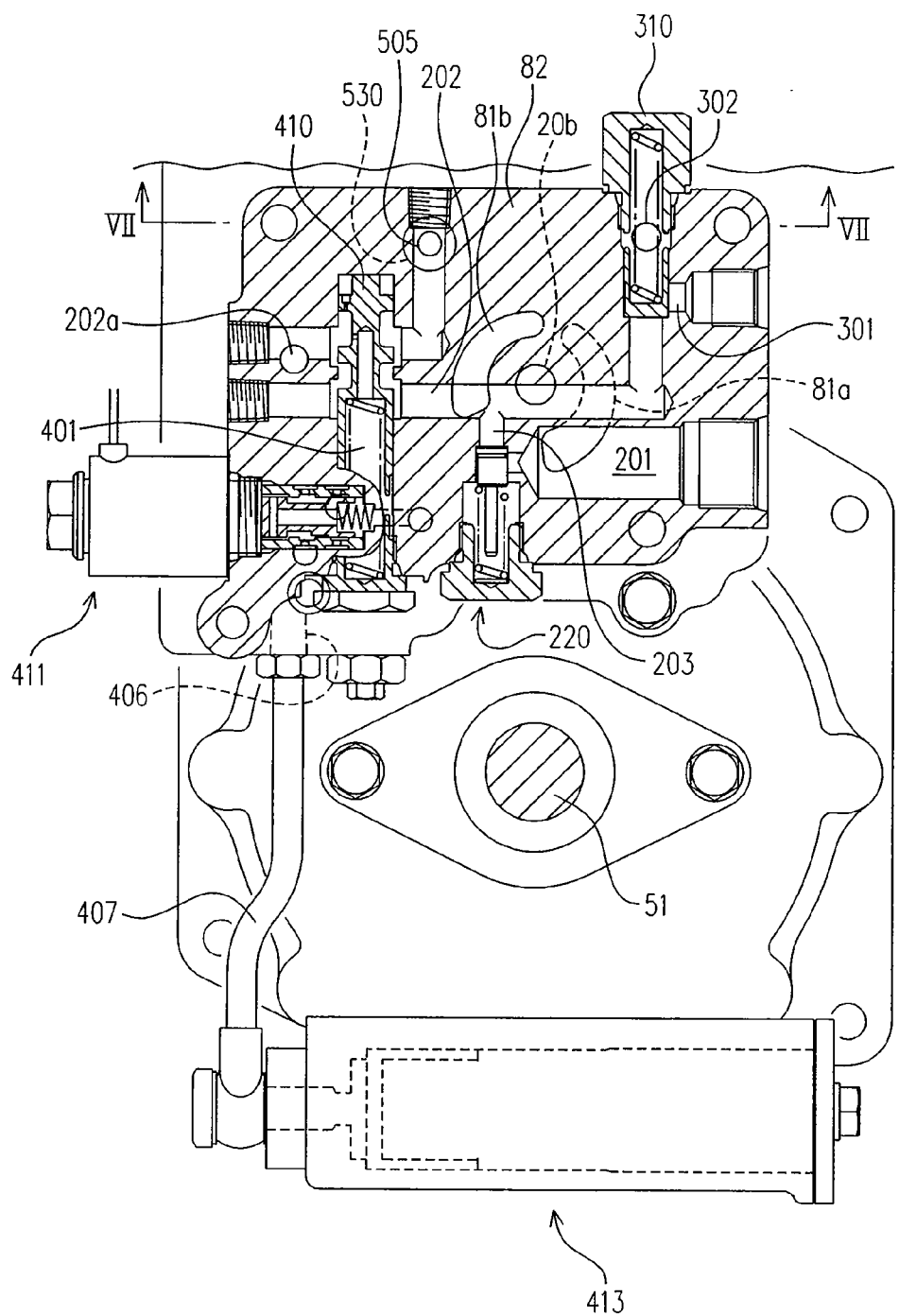
FIG. 6 is a cross sectional view taken along line VI-VI in FIG. 3.
Figure 7:
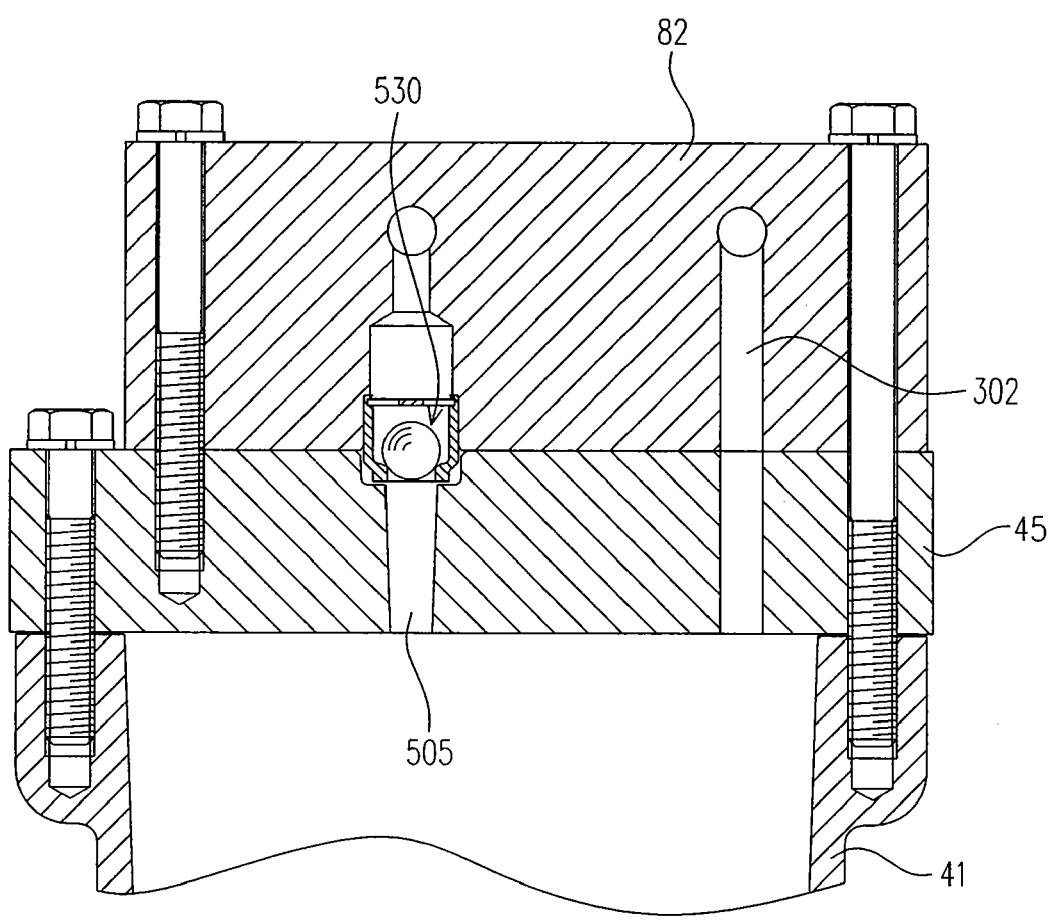
FIG. 7 is a cross sectional view taken along line VII-VII in FIG. 6.

FIG. 6 shows a cross sectional view taken along line VI-VI in FIG. 3. Further, FIG. 7 shows a cross sectional view taken along line VII-VII in FIG. 6.

As shown in FIG. 6, the charge pump case 82 is provided with a suction oil path 201 having a first end communicated with a suction port 81a of the charge pump body 81 and a second end opened outwardly, and a discharge oil path 202 having a first end communicated with a discharge port 81b of the charge pump body 81 and a second end branch-connected to various hydraulic circuit.

As shown in FIG. 2, the second end of the suction oil path 201 is connected to an optionally provided reservoir tank 250 via the oil path 211 such as a conduit into which a filter 210 is inserted.

The discharge oil path 202 is branched into a working machine operating hydraulic circuit 300, a PTO hydraulic circuit 400 and a traveling-system hydraulic circuit 500 while being set to a predetermined pressure by a relief valve 220.

The relief oil from the relief valve 220 is returned to the suction oil path 201 via the return oil path 203 arranged in the charge pump case 82 (see FIGS. 2 and 6).

The working machine operating hydraulic circuit 300 has a working machine operating oil path 301 for supplying pressure oil from the charge pump 80 toward the working machine such as a mower lifting device.

The working machine operating oil path 301 is connected to the discharge oil path 202 via a sequence 310.

In this embodiment, the working machine operating oil path 301 is formed on the charge pump case 82 so as to have a first end communicated with the discharge oil path 202 and a second end opened to the exterior surface, as shown in FIG. 6. The path is opened to the exterior surface of the charge pump case (see FIGS. 2 and 6).

As shown in FIGS. 2 and 7, a spring chamber of the sequence 310 is opened into the housing through an oil path 302 formed in the charge pump case and the center section.

The PTO hydraulic circuit 400 is configured so as to supply a part of the pressure oil of the discharge oil path 202 to the PTO device 50.

Figure 8:
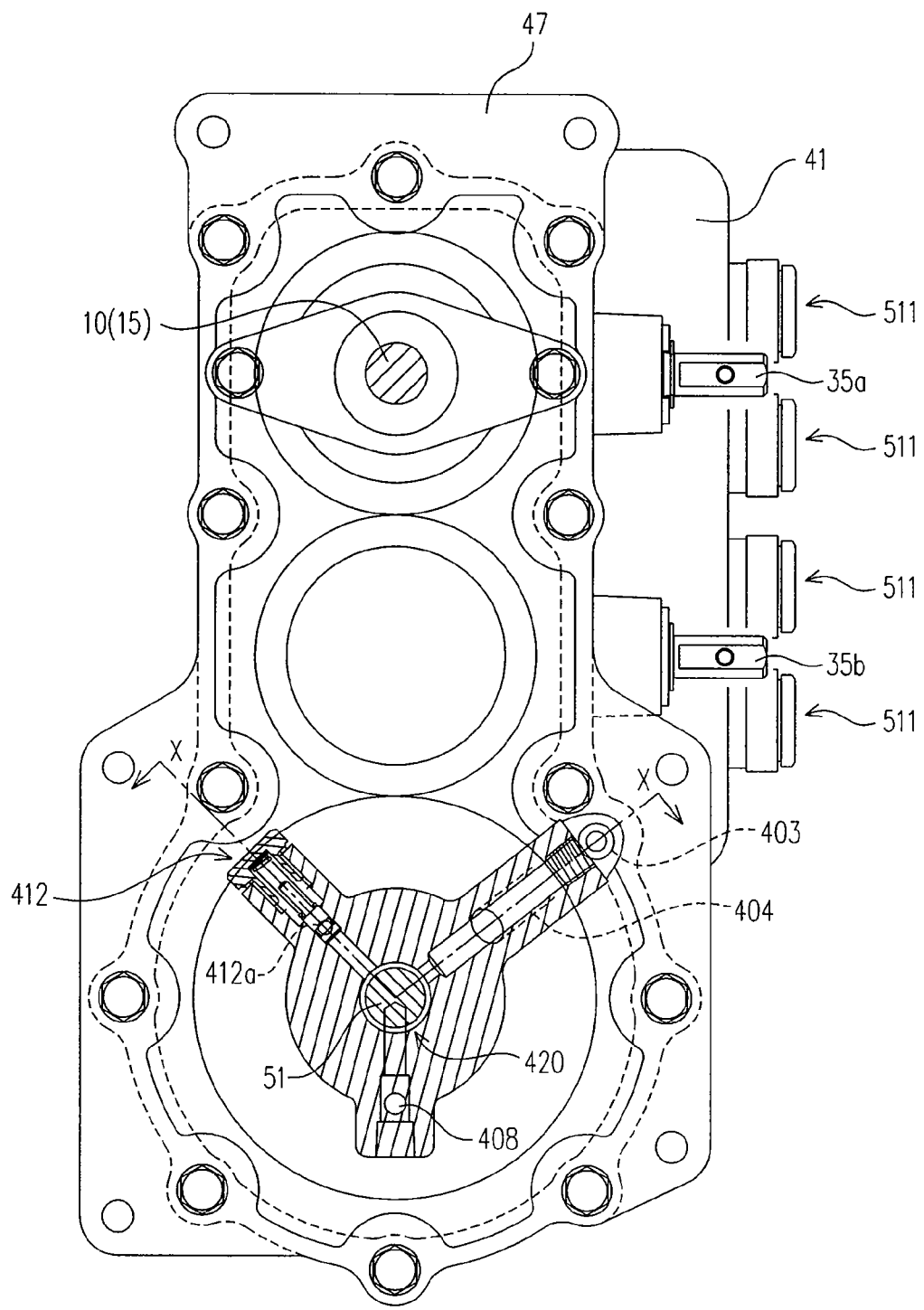
FIG. 8 is a cross sectional view taken along line VIII-VIII in FIG. 3.
Figure 9:
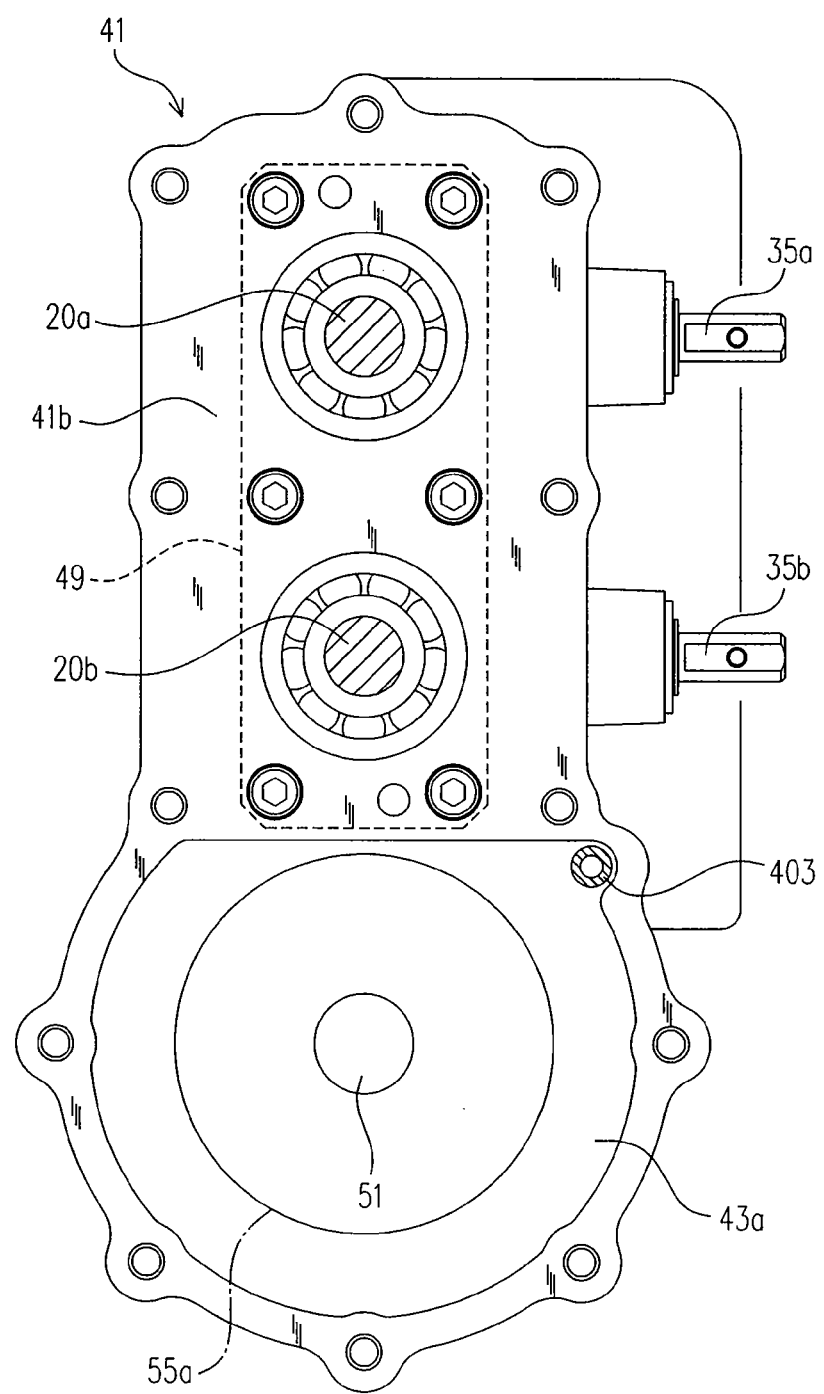
FIG. 9 is a cross sectional view taken along line IX-IX in FIG. 3.

FIGS. 8 and 9 show cross sectional views taken along line VIII-VIII and line IX-IX in FIG. 3, respectively.

Figure 10:
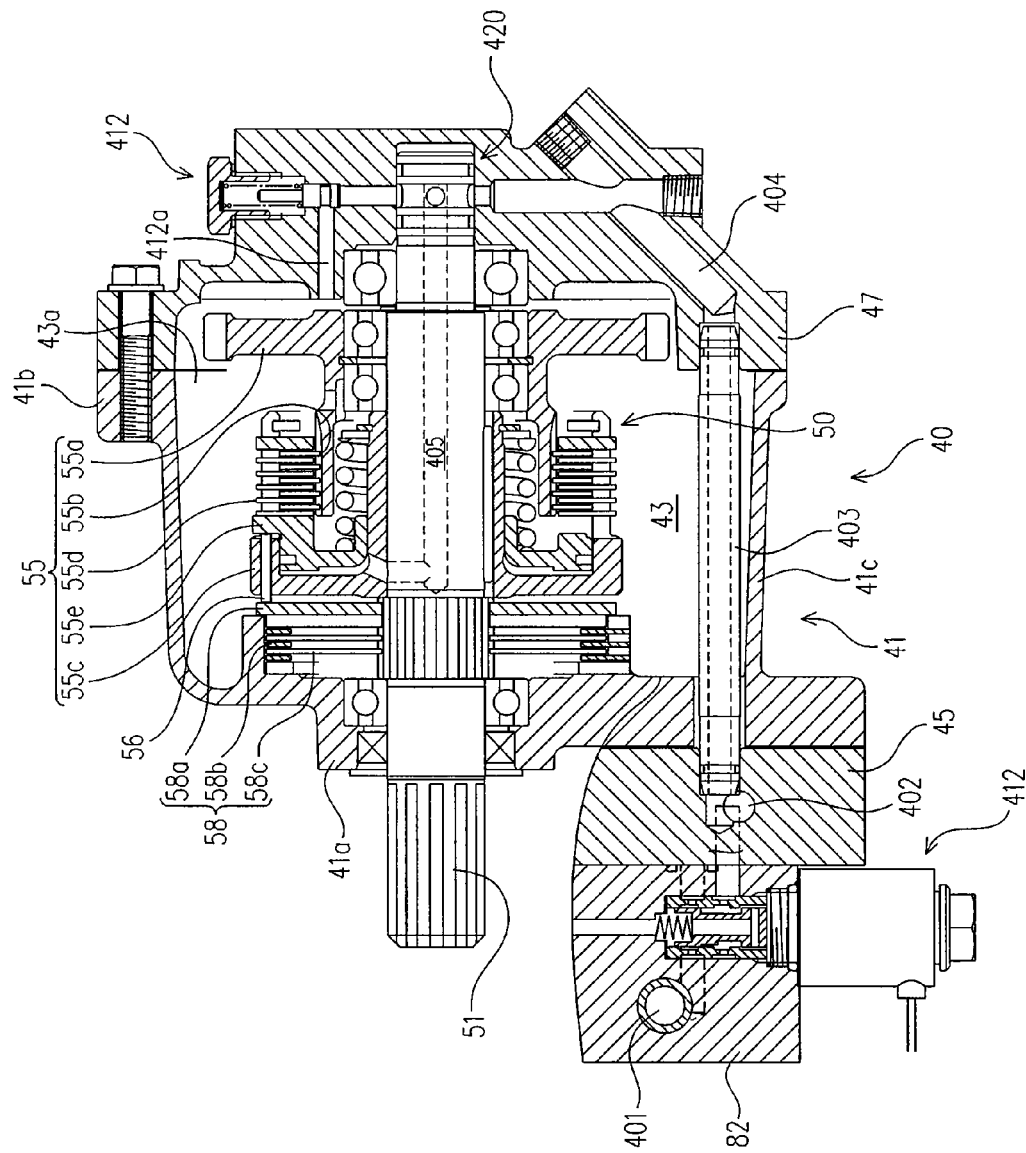
FIG. 10 is a cross sectional view taken along line X-X in FIG. 8.

FIG. 10 shows a cross sectional view taken along line X-X in FIG. 8.

As shown in FIGS. 2, 6 and 10, in this embodiment, the PTO hydraulic circuit 400 includes a first PTO oil path 401 formed in the charge pump case 82 so as to have a first end connected to the discharge oil path 202 via a depressurizing valve 410 and a second end opened to the contacting surface with the center section 45 of the charge pump case 82, a second PTO oil path 402 formed in the center section 45 so as to communicate with the second end of the first PTO oil path 401, a third PTO oil path 403 arranged within the housing body 41 so as to have a first end connected to the second PTO oil path 402 and a second end extending to the lid member 47, and a fourth PTO oil path 404 formed in the lid member 47 so as to communicate to the second end of the third PTO oil path 403.

As shown in FIG. 10, in this embodiment, a conduit extending between the center section 45 and the lid member 47 is used as the third PTO oil path 403, but an oil path may of course be formed in the peripheral wall 41c of the housing body 41 in place of the conduit.

The PTO hydraulic circuit 400 further has a clutch operating oil path 405 perforated in the PTO shaft 51 so as to communicate with the fourth PTO oil path 404.

More specifically, the PTO shaft 51 is supported so as to be rotatable about the axis line by the first end wall of the housing body 41 and the lid member 47, as shown in FIG. 10.

Further, a seal case part 420 including a ring-shaped oil distributing chamber is formed at the support portion of the lid member 47 and the PTO shaft 51 to communicate the fourth PTO oil path 404 with the clutch operating oil path 405.

In this embodiment, the lid member 47 is provided with a drain oil path 408 having a first end communicated with the seal case part 420 and a second end opened into the housing 40 (see FIG. 8); thus, preventing the leakage oil leaking in the seal case part 420 from acting as a back pressure of the PTO shaft 51.

As shown in FIG. 2, the PTO hydraulic circuit 400 further has a PTO solenoid valve 411, a PTO relief valve 412 and an accumulator 413 in the oil path extending from the discharge oil path 202 to the PTO device 50.

The PTO solenoid valve 411 is provided to selectively supply/block the pressure oil from the charge pump 80 to the hydraulic clutch 55 in the PTO device 50.

In this embodiment, the PTO solenoid valve 411 is arranged in the charge pump case 82 so as to be inserted into the first PTO oil path 401, as shown in FIG. 6.

The PTO relief valve 412 is provided to set the pressure oil supplied to the hydraulic clutch 55 through the clutch operating oil path 405 to a predetermined oil pressure.

In this embodiment, the PTO relief valve 412 is arranged in the lid member 47 so as to be inserted into the fourth PTO oil path 404, as shown in FIG. 10.

The drain oil from the PTO relief valve 412 is returned into the housing 41 via the drain oil path 412a formed in the lid member 47 (see FIGS. 2, 8, 10).

The accumulator 413 is provided to gradually increase the oil pressure of the clutch operating oil path 405 to the predetermined oil pressure set by the PTO relief valve 412.

Figure 11:
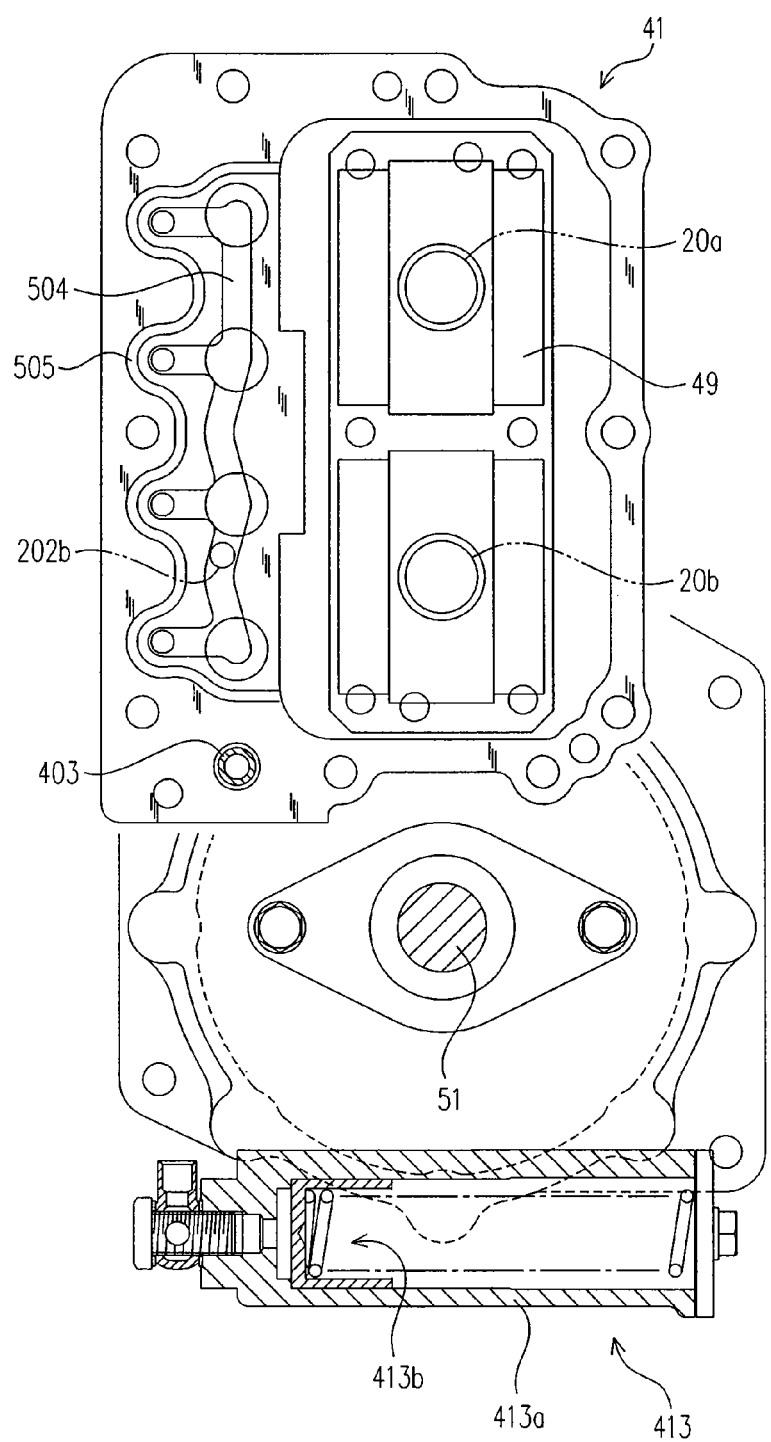
FIG. 11 is an end view taken along line XI-XI in FIG. 3 and shows an end view with the first and second hydraulic pump bodies removed.

FIG. 11 is an end view taken along line XI-XI in FIG. 3 and is an end view with the first and second hydraulic pump bodies 30a, 30b removed.

Figure 12:
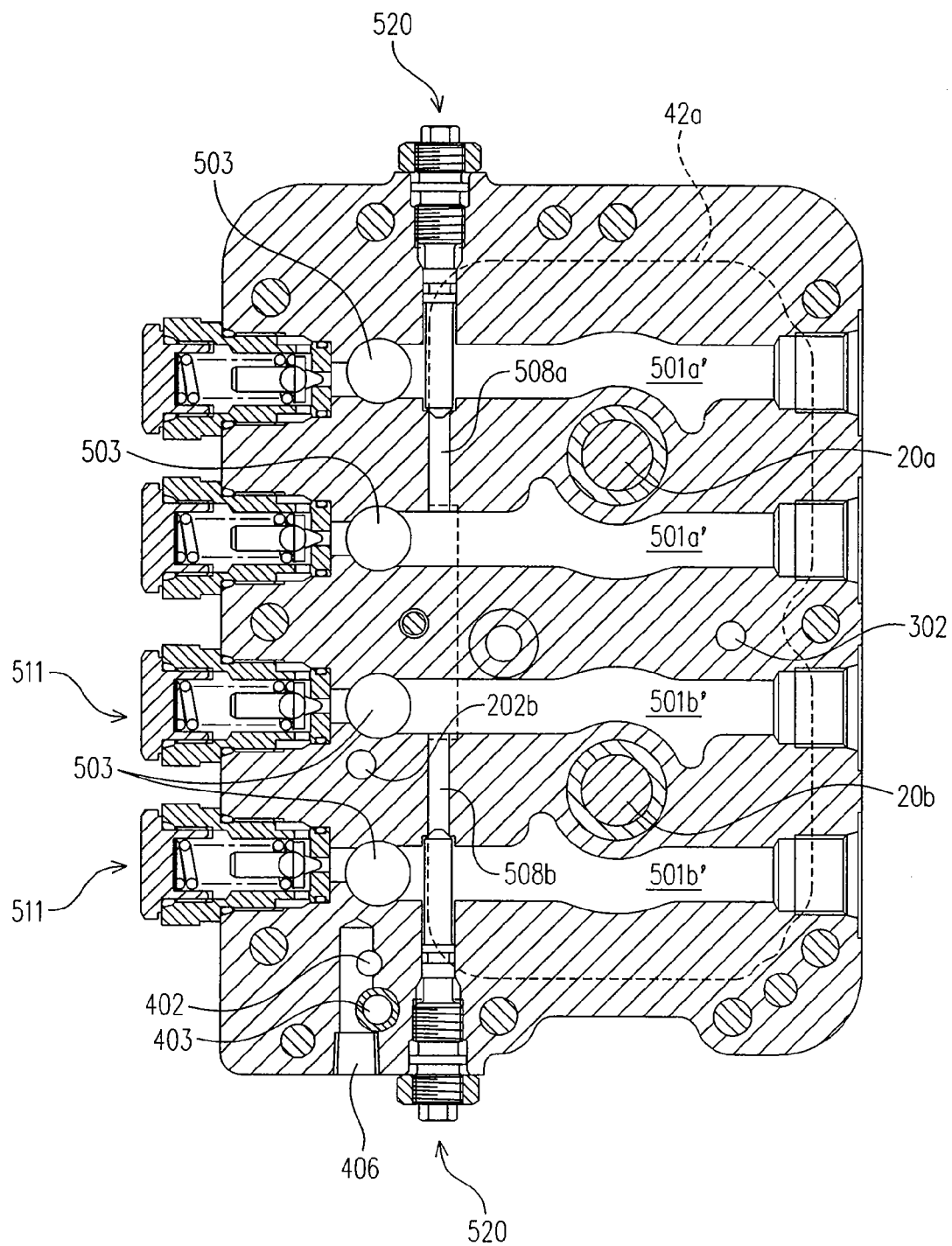
FIG. 12 is a cross sectional view taken along line XII-XII in FIG. 3.

FIG. 12 is a cross sectional view taken along line XII-XII in FIG. 3.

As shown in FIGS. 3 and 11, in this embodiment, the accumulator 413 includes an accumulator case 413a provided to the housing body 41, and an accumulator body 413b internally inserted into the accumulator case 413a.

More specifically, an accumulator oil path 406, which has a first end communicated with the second PTO oil path 402 and a second end opened to the exterior surface of the center section 45, is formed in the center section 45 (see FIGS. 2 and 12).

The second end of the accumulator oil path 406 and the accumulator 413 are communicated with each other by an appropriate conduit 407 (see FIG. 2).

In this embodiment, as described above, the accumulator case 413a is provided to the housing body 41, but of course, the accumulator body 413b may be inserted into the housing body 41, the charge pump case 82 or the center section 45, thus eliminating the accumulator case 413a. Further, an oil path substituting the conduit 47 can be perforated in the housing body 41.

In this embodiment, as shown in FIGS. 3 and 11, the accumulator 413 is provided to the housing body 41, and the PTO relief valve 412 is provided to the lid member 47, but in place thereof, both may be integrally provided.

Figure 13:
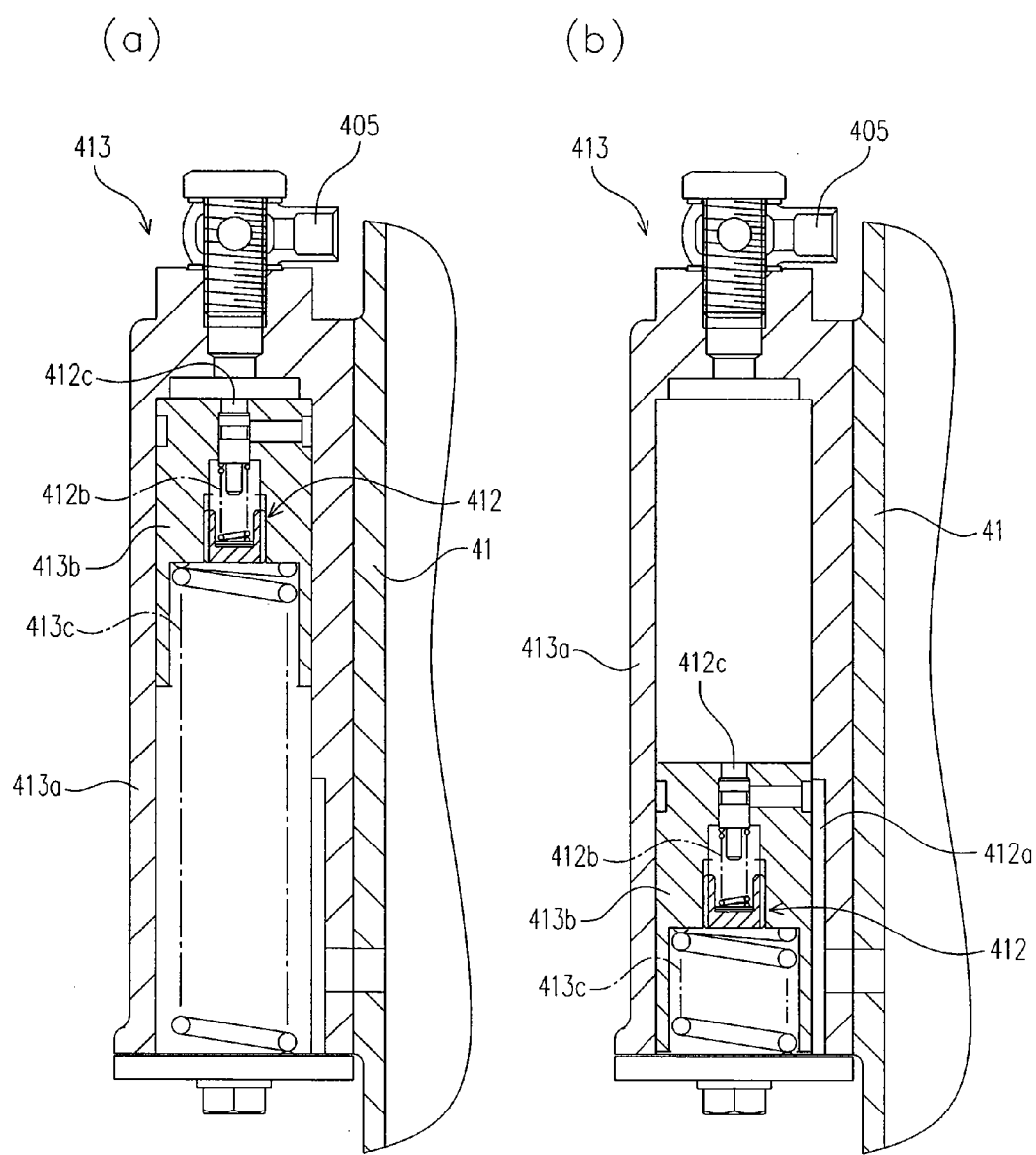
FIG. 13 is a cross sectional view of a modified pump unit according to the present invention.

For example, as shown in FIG. 13, the PTO relief valve 412 may be inserted into the accumulator case 413 provided to the housing body 41.

With the above configuration, the machining step for installing the PTO relief valve 412 to the lid member 47 can be eliminated, thus reducing the machining cost of the lid member 47.

Herein, description will be given of a configuration of a case in which the accumulator 413 and the PTO relief valve 412 are integrally formed.

As shown in FIG. 13, the PTO relief valve 412 is arranged in the accumulator body 413b so that the pressure receiving chamber 412c opens to the pressure receiving surface of the accumulator body 413b. The relief setting spring 412b of the PTO relief valve 412 is set so that the biasing force thereof is greater than that of the spring 413c of the accumulator 413.

Therefore, when the oil pressure is introduced into the clutch operating oil path 405, the accumulator body 413b moves from an initial position shown in FIG. 13(a) to a stroke end (see FIG. 13(b)) against the spring 413c in the accumulator case 413, thereby obtaining the effect of gradual increase of the oil pressure.

When the oil pressure of the clutch operating oil path 405 further rises, the oil pressure acts on the pressure receiving chamber 412c of the PTO relief valve 412 opened to the pressure receiving surface of the accumulator body 413b. When the oil pressure exceeds the biasing force of the relief setting spring 412b, the relief operation is carried out, and the drain oil is discharged from the accumulator body 413b to an oil sump within the housing body 41 through the drain oil path 412a formed in the accumulator case 413a.

Next, description will be given of the traveling-system hydraulic circuit.

FIG. 12 shows a cross sectional view taken along line XII-XII in FIG. 3.

As shown in FIG. 2, the traveling-system hydraulic circuit 500 includes a first hydraulic circuit 500a for fluidly connecting the first hydraulic pump body 30a to the first hydraulic motor unit 160a, and a second hydraulic circuit 500b for fluidly connecting the second hydraulic pump body 30b to the second hydraulic motor unit 160b.

The first hydraulic circuit 500a and the second hydraulic circuit 500b have substantially the same configuration. Therefore, in the figure, same reference characters (or same reference character with a different subscript) are denoted for the members same as or corresponding to the first hydraulic circuit 500a and the detailed description of the second hydraulic circuit 500b will not be given herein.

The first hydraulic circuit 500a connects the first hydraulic pump body 30a to the first hydraulic motor unit 160a so as to configure a closed circuit.

In this embodiment, the first hydraulic circuit 500a has a pair of first hydraulic lines 501a for connecting the first hydraulic pump body 30a to the first hydraulic motor unit 160a, and a charge line 502a for communicating between the pair of first hydraulic lines 501a.

One of the pair of first hydraulic lines 501a communicates the discharge port in the first hydraulic pump body 30a with the suction port in the first hydraulic motor unit 160a, and the other of the pair of the first hydraulic line 501a communicates the suction port of the first hydraulic pump body 30a with the discharge port in the first hydraulic motor unit 160a.

In this embodiment, as shown in FIG. 12, a pair of first oil paths 501a' forming a part of the pair of first hydraulic line 501 is formed in the center section 45.

One of the pair of first oil paths 501a' has a first end communicated with the discharge port of the first hydraulic pump body 30a and a second end opened to the exterior surface of the center section 45.

Similarly, the other of the pair of the first oil path lines 501a' has a first end communicated with the suction port of the first hydraulic pump body 30a and a second end opened to the exterior surface of the center section 45.

The charge line 502a is configured to supply the pressure oil from the charge pump 80 to each of the pair of first hydraulic lines 501a.

In this embodiment, the charge line 502a is formed at the center section 45 and the housing body 41.

More specifically, as shown in FIGS. 11 and 12, the charge line 502a has a pair of charge oil paths 503 formed in the center section 45 so as to have a first end communicated with each of the pair of first oil paths 501a' and a second end opened to the contacting surface with the housing body 41 in the center section 45, and a communication groove 504 formed on the contacting surface with the center section 45 of the first end wall 41a in the housing body 41 so as to communicate the second ends of the pair of charge oil paths 503.

The discharge oil path 202 is connected to the communication groove 504.

More specifically, as shown in FIGS. 6 and 7, the discharge oil path 202 has a first portion 202a formed in the charge pump case 82, and a second portion 202b formed in the center section 45 so as to communicate with the first portion 202a and open to the communication groove 504.

Reference numeral 505 in FIG. 11 denotes a drain groove formed on the contacting surface with the center section 45 in the first end wall 41a so as to surround the opening ends of the pair of charge oil paths 503 and the communication groove 504 in order to return the leakage oil, generated when flowing oil from the discharge oil path 202 to the charge line 502a, into to the housing 40.

The charge line 502a further has a pair of check valves 510 arranged between the communication groove 504 and the pair of charge oil paths 503, respectively, as shown in FIGS. 2, 4, 5 and 12.

The pair of check valves 510 are provided to allow the flow of oil from the discharge oil path 202 to each of the pair of first oil path 501a', and to prevent the oil from flowing in the reverse direction.

In this embodiment, as shown in FIGS. 3 and 4, the check valve 510 is arranged on the mating surface of the center section 45 and the housing body 41.

Further, the charge line 502a may have a high-pressure relief valve 511 for setting the maximum oil pressure of each of the pair of first hydraulic lines 501a (or the pair of first oil paths 501a').

By providing the high-pressure relief valve 511, the pair of first hydraulic lines 501a can be effectively prevented from becoming excessively high pressure.

In this embodiment, as shown in FIGS. 3 and 4, each of the pair of high-pressure relief valves 511 are arranged between the communication groove 504 and the pair of first oil paths 501a'.

That is, in this embodiment, when the oil pressure of the pair of first oil path 501a' becomes excessively high, the relief oil from the pair of first oil path 501a' is discharged to the communication groove 504 via the corresponding high-pressure relief valve 511.

Preferably, as shown in FIGS. 2, 4 and 5, the charge line 502a may have an orifice 512 for communicating at least one of the pair of first hydraulic lines 501a to the external line or externally.

By providing the orifice 512, a neutral state of the first hydraulic pump body 30a can be reliably achieved.

In this embodiment, the orifice 512 is arranged between one of the first oil paths 501a' (preferably, the first oil path 501a' that becomes high pressure when the vehicle moves backward) and the communication groove 504.

By providing the orifice 512 so that the first oil path 501a' that becomes high pressure when the vehicle moves backward communicates to the external line or externally, deterioration of transmission efficiency during the forward movement of the vehicle in which long driving time and high efficiency are required can be effectively prevented.

Preferably, the first hydraulic circuit 500a may include a bypass line 508a for communicating between the pair of first hydraulic lines 501a, and a bypass valve 520 inserted into the bypass line 508a so as to selectively communicate/block the bypass line 508a with the external operation.

With the above configuration, upon, for example, forcibly towing the vehicle, the pressure difference can be prevented from creating between the pair of first hydraulic lines 501a.

In this embodiment, as shown in FIG. 12, the bypass line 508a is formed in the center section 45 so as to communicate between the pair of first oil paths 501a'.

The traveling-system hydraulic circuit 500 further has a free wheel preventing check valve 530, as shown in FIG. 2.

The free wheel preventing check valve 530 is provided to naturally resupply the oil to the pair of first and second hydraulic lines 501a, 501b when the amount of oil within the pair of first hydraulic lines 501a and the pair of second hydraulic lines 501b decrease for some reason.

By providing the free wheel preventing check valve 530, when the vehicle is stopped at, for example, a hill without pulling the parking brake, the vehicle axle can be effectively prevented from rotating uncontrollably in spite of keeping the first and second hydraulic pump bodies 30a, 30b in the neutral state.

In this embodiment, as shown in FIGS. 6 and 7, a suction oil path 505, which has a first end communicated with the housing 40 and a second end communicated with the discharge oil path 202, is formed on the charge pump case 802 and the center section 45. The free wheel preventing check valve 530 is inserted into the suction oil path 505.

In the pump unit 1 of the above configuration, the following effects can be obtained in addition to the above-described various effects.

That is, as described above, the pump unit 1 configures a traveling-system transmission mechanism by being fluidly connected to the pair of hydraulic motor unit 160a, 160b allocated and arranged in the width direction of the vehicle.

Therefore, the pump unit 1 can effectively prevent the traveling-system transmission mechanism from being arranged at the central portion in the width direction of the body frame 110 of the vehicle.

Further, the pump unit 1 has the pump accommodating section 42 and the PTO accommodating section 43 allocated and arranged on one side and the other side in the width direction of the housing 40 of the vehicle, respectively, and has the input shaft 10 supported on one side in the width direction of the vehicle rather than the PTO shaft 51.

Normally, the driving source 150 is arranged at substantially the central portion in the width direction of the body frame 110 taking into consideration the vehicle balance (see FIG. 1(b)) and the like. Therefore, in order to perform the operative connection to the driving source 150 with a simple configuration, it is preferable to arrange the housing 40 so that the input shaft 10 is positioned at substantially the central portion in the width direction of the body frame 110.

The pump unit 1 according to this embodiment has the above configuration. Thus, if the housing 40 is arranged so that the input shaft 10 is positioned at substantially the central portion in the width direction of the body frame 110, the PTO shaft 51 is displaced to and arranged on the other side of the width direction of the body frame of the vehicle.

In this way, in the pump unit 1 according to this embodiment, positioning of both the traveling-system transmission mechanism and the PTO-system transmission mechanism at the central portion in the width direction of the body frame 110 can be effectively prevented, and a free space at the central portion in the width direction of the body frame 110 can be secured. Therefore, the degree of freedom in design of the working vehicle can be improved. Further, in the working vehicle equipped with the ground working machine 140 having the input part not at the center but displaced to one side in the width direction of the vehicle, the transmission path to the input part of the ground working machine 140 can be readily made short and, therefore, is very effective.

Further, in this embodiment, the input shaft 10 (or the single shaft 15) integrally formed with the first pump shaft 20a, the second pump shaft 20b and the PTO shaft 51 are arranged sequentially from one side to the other side in the width direction of the housing 40 of the vehicle.

Therefore, the power transmission from the input shaft 10 to the first pump shaft 20a, the second pump shaft 20b and the PTO shaft 51 can be carried out with a simple configuration while maintaining the distance between the axes of the input shaft 10 and the PTO shaft 51.

In this embodiment, as described above, the input shaft 10 and the first pump shaft 20a are integrally formed, but may also be formed with a separate shaft in which the relevant shafts are arranged concentrically.

In the case where the input shaft 10 and the first pump shaft 20a are formed with a separate shaft, the input shaft 10 is positioned so as to be closest to one side in the width direction of the housing 40 of the vehicle than any other shaft, and the PTO shaft 51 can be positioned so as to be closest to the other side in the width direction of the housing 40 of the vehicle than any other shaft.

This specification is by no means intended to restrict the present invention to the preferred embodiments set forth therein. Various modifications to the pump unit, as well as the working vehicle as described herein, may be made by those skilled in the art with out departing from the spirit and scope of the present invention as defined in the appended claims.

What is claimed is:

1. A pump unit for transmitting mechanical power from a driving source through fluid power to first and second hydraulic motor units allocated and respectively arranged on first and second sides in a width direction of a vehicle so as to be output to a pair of right and left driving wheels, the pump unit comprising:

a housing;

a first pump shaft supported by the housing so as to be along a longitudinal direction of the vehicle;

a second pump shaft supported by the housing so as to be along the longitudinal direction of the vehicle closer to the second side of the vehicle in the width direction than to the first pump shaft;

first and second hydraulic pump bodies accommodated in the housing so as to be driven by the first and second pump shafts, respectively, and fluidly connected to the first and second hydraulic motor units, respectively;

a PTO device accommodated in the housing, the PTO device including a PTO shaft that is supported by the housing so as to be along the longitudinal direction of the vehicle closer to the second side of the vehicle in the width direction than to the second pump shaft and have an end on a side away from the driving source extended outward from the housing and a hydraulic PTO clutch that has a driving-side member supported on the PTO shaft in a relatively rotatable manner and a driven-side member supported on the PTO shaft in a relatively non-rotatable manner; and a power transmission mechanism including a first gear supported on the first pump shaft in a relatively non-rotatable manner and a second gear supported on the second pump shaft in a relatively non-rotatable manner in a state of being engaged with the first gear, the second gear engaging the driving-side member; wherein the housing including a housing body that has first and second end walls opposing to each other in a state of being away along the longitudinal direction and a peripheral wall extending edges of the first and second end walls, the first end wall being formed with a first opening through which the first and second hydraulic pump bodies can be passed; a center section detachably connected to the first end wall so as to liquid-tightly close the first opening; and a lid member detachably connected to the second end wall so as to form an accommodating space for accommodating the power transmission mechanism between the lid member and the second end wall;

the first pump shaft, which is positioned on a side opposite the PTO shaft in the vehicle width direction with the second pump shaft in between, has an end, on a side close to the driving source, extended outward from the housing to form an input end operatively connected to the driving source;

the first pump shaft is supported by a pair of bearing members respectively provided at the second end wall and the lid member so as to sandwich the first gear, and the center section;

the second pump shaft is supported by a pair of bearing members respectively provided at the second end wall and the lid member so as to sandwich the second gear, and the center section; and the housing has a seal case portion arranged at a member for supporting an end on a side close to the driving source of the PTO shaft, the seal case portion including a ring-shaped oil distributing chamber for supplying operation oil to a PTO clutch operating oil path formed in the PTO shaft so as to supply the operation fluid to the PTO clutch.

2. A pump unit according to claim 1, wherein at least one of the first and second pump shafts has an end extended outwardly from the center section, and the outward end supports a charge pump body, and the housing is formed with a pair of first oil paths forming a part of a pair of first hydraulic lines for fluidly connecting the first hydraulic pump body and a hydraulic motor body of the first hydraulic motor unit, a pair of second oil paths forming a part of a pair of second hydraulic lines for fluidly connecting the second hydraulic pump body and a hydraulic motor body of the second hydraulic motor unit, a suction oil path having a first end opened to an outer surface and a second end fluidly connected to a suction port of the charge pump body, a discharge oil path fluidly connected to a discharge port of the charge pump body, a charge oil path having a first end fluidly connected to the discharge oil path and second ends fluidly connected to the pair of first oil paths and the pair of second oil paths, a PTO oil path having a first end fluidly connected to the discharge oil path and a second end fluidly connected to the PTO clutch, and a working machine operating oil path having a first end fluidly connected to the discharge oil path and a second end opened to an outer surface.

3. A pump unit according to claim 2, wherein the housing is provided with a relief valve for setting a hydraulic pressure of the discharge oil path, the first end of the charge oil path is fluidly connected to the discharge oil path via a pressure-reducing valve, the first end of the PTO oil path is fluidly connected to the discharge oil path via an orifice, and the first end of the working machine operating oil path is fluidly connected to the discharge oil path via a sequence.

4. A pump unit according to claims 3, wherein the housing is further provided with a return oil path for returning the relief oil from the relief valve to the suction oil path.

5. A pump unit according to 2, wherein the housing is configured so that the first end wall is disposed away from the driving source, the second end wall is disposed close to the driving source, the second end wall is formed with a second opening through which the PTO device can be passed, and the lid member is connected to the second end wall so as to liquid-tightly close the second opening, the housing further includes a charge pump case connected to the first end wall so as to surround the charge pump body, the PTO oil path includes a first PTO oil path formed in the charge pump case so as to have a first end fluidly connected to the discharge oil path and a second end opened to a contacting surface with the center section, a second PTO oil path formed in the center section so as to have a first end opened to a contacting surface with the charge pump case to fluidly connect to the second end of the first PTO oil path, a third PTO oil path arranged within the housing body so as to have a first end fluidly connected to the second PTO oil path and a second end extending to the lid member, a fourth PTO oil path formed in the lid member so as to be fluidly connected to the third PTO oil path, and the PTO clutch operating oil path formed in the PTO shaft, and the fourth PTO oil path and the PTO clutch operating oil path are fluidly connected to each other via the seal case portion formed at a supporting portion for supporting the PTO shaft of the lid member.

6. A pump unit according to claim 5, wherein a PTO switching valve for selectively engaging or disengaging the oil supply from the charge pump body to the PTO device, and a PTO relief valve for setting the hydraulic pressure of the PTO oil path are interposed in the PTO oil path, and the PTO switching valve is mounted at the charge pump case so as to be interposed in the first PTO oil path, and the PTO relief valve is mounted at the lid member so as to be interposed in the fourth PTO oil path.

7. A pump unit according to claim 6, wherein an accumulator for gradually increasing the hydraulic pressure of the clutch operating oil path to the hydraulic pressure set by the PTO relief valve is interposed in the PTO oil path, and the accumulator includes an accumulator case provided at the housing body and an accumulator body internally inserted into the accumulator case.

8. A pump unit according to claim 5, wherein a PTO switching valve for selectively engaging or disengaging the oil supply from the charge pump body to the PTO device, a PTO relief valve for setting the hydraulic pressure of the PTO oil path, and an accumulator for gradually increasing the hydraulic pressure of the clutch operating oil path to the hydraulic pressure set by the PTO relief valve are interposed in the PTO oil path, the PTO switching valve is mounted at the charge pump case so as to be interposed in the first PTO oil path, the accumulator includes an accumulator case provided at the housing body and an accumulator body internally inserted into the accumulator case, and the PTO relief valve is internally mounted in the accumulator case.

* * * * *